(12) United States Patent
Ahn et al.

(10) Patent No.: US 10,998,136 B2
(45) Date of Patent: May 4, 2021

(54) THREE-DIMENSIONAL CAPACITOR

(71) Applicant: Point Engineering Co., Ltd., Asan-si (KR)

(72) Inventors: Bum Mo Ahn, Suwon-si (KR); Seung Ho Park, Hwaseong-si (KR); Sung Hyun Byun, Hwaseong-si (KR)

(73) Assignee: Point Engineering Co., Ltd., Asan-si (KR)

( * ) Notice: Subject to any disclaimer, the term of this patent is extended or adjusted under 35 U.S.C. 154(b) by 0 days.

(21) Appl. No.: 15/618,201

(22) Filed: Jun. 9, 2017

(65) Prior Publication Data

US 2017/0358395 A1    Dec. 14, 2017

(30) Foreign Application Priority Data

Jun. 9, 2016    (KR) .................. 10-2016-0071682

(51) Int. Cl.
| | |
|---|---|
| *H01G 4/33* | (2006.01) |
| *H01G 4/005* | (2006.01) |
| *H01G 4/10* | (2006.01) |
| *H01G 4/012* | (2006.01) |

(52) U.S. Cl.
CPC ............. *H01G 4/33* (2013.01); *H01G 4/005* (2013.01); *H01G 4/012* (2013.01); *H01G 4/10* (2013.01)

(58) Field of Classification Search
CPC ................................. H01G 4/33; H01G 4/005
See application file for complete search history.

(56) References Cited

U.S. PATENT DOCUMENTS

| | | | |
|---|---|---|---|
| 7,903,387 B2 | 3/2011 | Masuda et al. | |
| 8,064,189 B2 | 11/2011 | Masuda et al. | |
| 2006/0138664 A1* | 6/2006 | Ito | H01J 1/312 257/759 |
| 2009/0154054 A1* | 6/2009 | Masuda | H01G 4/005 361/275.1 |
| 2011/0013340 A1* | 1/2011 | Horiuchi | H01G 4/012 361/311 |
| 2012/0300360 A1* | 11/2012 | Take | H01G 4/30 361/301.4 |
| 2013/0027841 A1 | 1/2013 | Jung | 361/321.2 |
| 2013/0120901 A1* | 5/2013 | Masuda | H01G 4/005 361/303 |
| 2013/0329337 A1* | 12/2013 | Masuda | H01G 4/005 361/303 |

(Continued)

FOREIGN PATENT DOCUMENTS

| | | | |
|---|---|---|---|
| DE | 10-2013-0012715 | 2/2013 | ............... H01G 4/12 |
| JP | H07-283076 A | 10/1995 | |

(Continued)

OTHER PUBLICATIONS

Korean Intellectual Property Office, Office Action—Korean Application No. 10-2016-0071682, dated Jun. 14, 2017, 5 pages.

(Continued)

*Primary Examiner* — David M Sinclair

(57) ABSTRACT

Provided is a three-dimensional (3D) capacitor including conductors formed at a high density inside holes of an anodic oxide film, and a first electrode layer and a second electrode layer electrically connected to the conductors. Thus, a high capacitance relative to a size of the 3D capacitor may be easily achieved.

1 Claim, 8 Drawing Sheets

(56) References Cited

U.S. PATENT DOCUMENTS

| | | | | |
|---|---|---|---|---|
| 2013/0329339 A1* | 12/2013 | Masuda | ................... | H01G 4/06 |
| | | | | 361/311 |
| 2013/0335880 A1* | 12/2013 | Masuda | ................ | H01G 4/005 |
| | | | | 361/303 |
| 2014/0009866 A1* | 1/2014 | Masuda | ................ | H01G 4/005 |
| | | | | 361/306.1 |
| 2014/0063690 A1* | 3/2014 | Masuda | ................... | H01G 4/10 |
| | | | | 361/321.5 |
| 2014/0153157 A1* | 6/2014 | Masuda | ................... | H01G 4/30 |
| | | | | 361/305 |
| 2014/0226257 A1* | 8/2014 | Take | ..................... | H01G 4/302 |
| | | | | 361/303 |

FOREIGN PATENT DOCUMENTS

| | | | |
|---|---|---|---|
| JP | 2009-021553 A | | 1/2009 |
| JP | 2009-049212 A | | 3/2009 |
| JP | 2009059990 A | * | 3/2009 |
| JP | 2015122467 A | * | 7/2015 |
| KR | 10-2013-0012715 | | 2/2013 |

OTHER PUBLICATIONS

Korean Intellectual Property Office, Office Action—Korean Application No. 10-2016-0071682, dated Jun. 14, 2017, 8 pages. (English translation).

* cited by examiner

THREE-DIMENSIONAL CAPACITOR

CROSS-REFERENCE TO RELATED PATENT APPLICATION

This U.S. non-provisional patent application claims priority under 35 U.S.C. § 119 of Korean Patent Application No. 10-2016-0071682 filed on Jun. 9, 2016 in the Korean Patent Office, the entire contents of which are hereby incorporated by reference.

BACKGROUND

1. Technical Field

The present invention relates to a three-dimensional (3D) capacitor using an anodic oxide film.

2. Description of Related Art

A capacitor has been used as a battery which stores or discharges electric power, and to use a property thereof which does not allow direct current to pass therethrough. A capacitor has a structure in which two insulated flat electrodes are arranged to be close to each other and a dielectric is interposed between them.

When direct current is supplied to a capacitor, current flows through the capacitor as electric charges are accumulated in each of electrodes of the capacitor, and the flow of the current is stopped when the accumulation of the electric charges ends. However, current flows again in a moment through the capacitor when the electrodes are changed and direct current is supplied thereto. Owing to the characteristics of the capacitor, the capacitor is used to store electric power as well as to block direct current and transmit alternating current.

Such capacitors may be divided into an air capacitor, a vacuum capacitor, a gas capacitor, a liquid capacitor, a mica capacitor, a ceramic capacitor, a paper capacitor, a plastic-film capacitor, an electrolytic capacitor, and the like according to a material of a dielectric thereof.

Examples of an electrolytic capacitor include an aluminum electrolytic capacitor and a tantalum electrolytic capacitor. Generally, an electrolytic capacitor refers to an aluminum electrolytic capacitor. In an electrolytic capacitor, a thin oxide film is used as a dielectric and aluminum is used as an electrode. By forming a dielectric to have a very thin thickness, a high capacitance, relative to a volume thereof, may be achieved.

Recently, research has been actively conducted on a multi-layer ceramic capacitor (MLCC) formed by alternately stacking a ceramic and a metal (e.g., nickel). An MLCC is formed to a height of 0.3 mm, which is equal to a diameter of a human hair, by alternately stacking 200 to 1000 layers of a ceramic and a metal.

An MLCC is configured to store electric power by stacking multiple layers of a ceramic and nickel on the basis of a principle that nickel is a metal and thus carries electric current, but ceramic does not carry the electric current.

An MLCC is a key component of electronic products, and thus several hundred MLCCs are essentially included in an electronic product such as a cellular phone, a smart phone, a liquid crystal display (LCD) television (TV), a computer, etc. As electronic devices are being developed to be smaller and smaller, higher technical skills are required to make MLCCs having a smaller size and a higher capacity.

As the distance between electrodes decreases and a contact area between the electrodes increases, a capacity of a capacitor increases. However, as more layers of a ceramic and nickel are stacked, it is difficult to manufacture a capacitor in a small size and the number of processes therefor increases.

SUMMARY

1. Technical Problem

The present invention is directed to a three-dimensional (3D) capacitor capable of easily achieving a high capacitance relative to a size thereof.

2. Solution to Problem

A three-dimensional (3D) capacitor according to the present invention includes an anodic oxide film formed of anodizable metal and having a plurality of holes formed therein in a vertical direction; conductors formed inside the plurality of holes; and a first electrode layer and a second electrode layer formed on at least one surface of the anodic oxide film to be electrically connected to at least some of the conductors, the first and second electrode layers being electrically separated from each other.

The first and second electrode layers may be formed on the same surface of the anodic oxide film.

The first electrode layer and the second electrode layer may be alternately arranged.

The first electrode layer may be formed on one surface of the anodic oxide film. The second electrode layer may be formed on another surface of the anodic oxide film which is opposite to the surface the first electrode layer is formed.

A vertically projected region of the first electrode layer and a vertically projected region of the second electrode layer may be alternately arranged.

The plurality of holes may be air holes which are formed by anodizing a metal and are arranged regularly. The air holes may be formed to pass through the anodic oxide film in the vertical direction.

The plurality of holes may be air holes which are formed by anodizing a metal and are arranged regularly. The anodic oxide film may include a porous layer including the air holes therein, and a barrier layer configured to close one ends of the air holes and formed below the porous layer.

The anodic oxide film may include a porous layer including air holes which are formed by anodizing a metal and are arranged regularly; and a barrier layer configured to close one ends of the air holes and formed below the porous layer. The plurality of holes may be formed to have a larger inner width than the air holes.

A plurality of anodic oxide films may be stacked in the vertical direction.

3. Advantageous Effects

According to the present invention, the following advantageous effects can be achieved.

By using an anodic oxide film having an insulating property and a plurality of conductors which are arranged at a high density in the anodic oxide film and to which electric current is supplied, a high capacitance, relative to a size of a capacitor, can be easily achieved.

The capacitors can be easily manufactured.

DETAILED DESCRIPTION OF EMBODIMENTS

Figure 1:
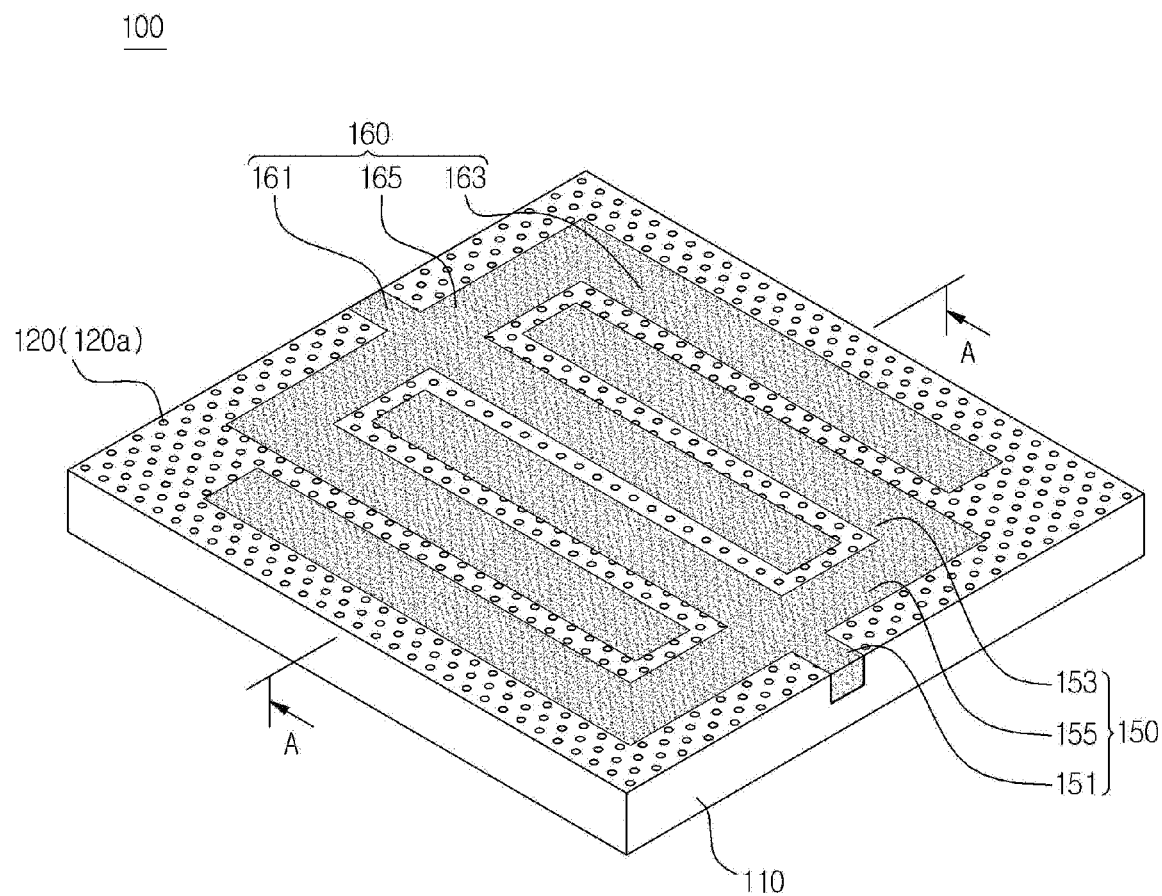
FIG. 1 is a perspective view of a three-dimensional (3D) capacitor according to a first embodiment of the present invention.

Hereinafter, exemplary embodiments of the present invention will be described in detail with reference to the accompanying drawings. Advantages and features of the present invention and methods of achieving them will be apparent from the embodiments which will be described below in conjunction with the accompanying drawings. However, the present invention is not limited to theses embodiments and may be embodied in many different forms. Rather, these embodiments are provided so that this disclosure will be thorough and complete and will fully convey the concept of the invention to those of ordinary skill in the art. The scope of the present invention should be defined only by the claims. The same reference numerals represent the same elements throughout the drawings.

The terminology used herein is for the purpose of describing particular embodiments only and is not intended to limit the invention. As used herein, the singular forms "a," "an," and "the" are intended to include the plural forms as well, unless the context clearly indicates otherwise. It should be further understood that the terms "comprises" and/or "comprising," when used herein, specify the presence of stated components, steps, operations, and/or elements, but do not preclude the presence or addition of one or more other components, steps, operations, and/or elements thereof. Furthermore, since exemplary embodiments are provided herein, reference numerals are not construed as being limited by the order in which they are described herein.

The embodiments set forth herein will be described below with reference to cross-sectional views and/or plan views which are ideal exemplary drawings of the present invention. In the drawings, a size and thickness of each film and hole are exaggerated for clarity. Thus, shapes of the drawings may vary according to manufacturing techniques and/or tolerances. Accordingly, it should be understood that embodiments of the present invention are not limited to specific shapes illustrated in the drawings, cover any modifications according to manufacturing processes, and are not intended to limit the scope of the invention.

Figure 2A:
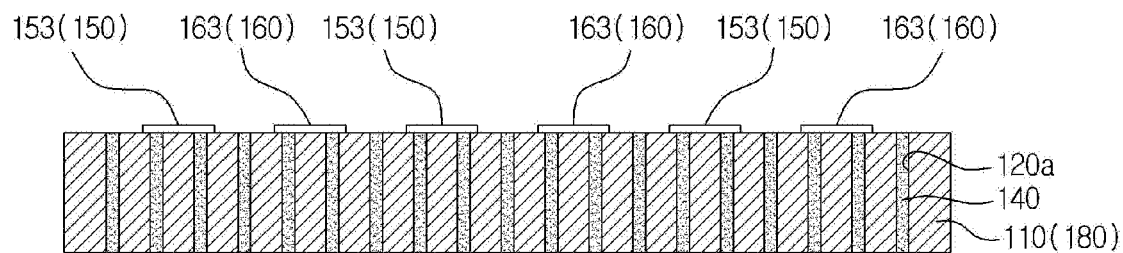
FIGS. 2A-2C illustrate a cross-sectional view taken along line A-A of FIG. 1 and modified examples thereof.
Figure 2B:
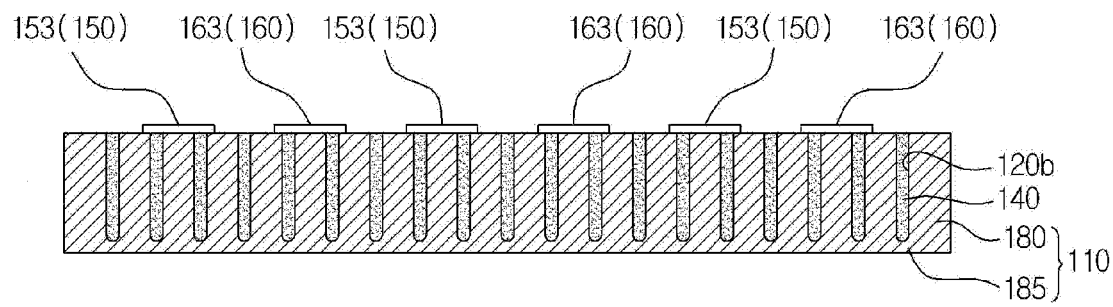
Figure 2C:
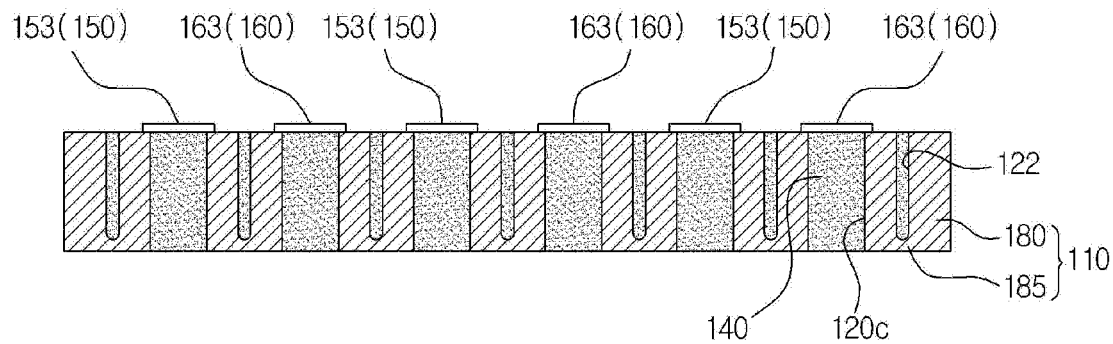
Figure 3:
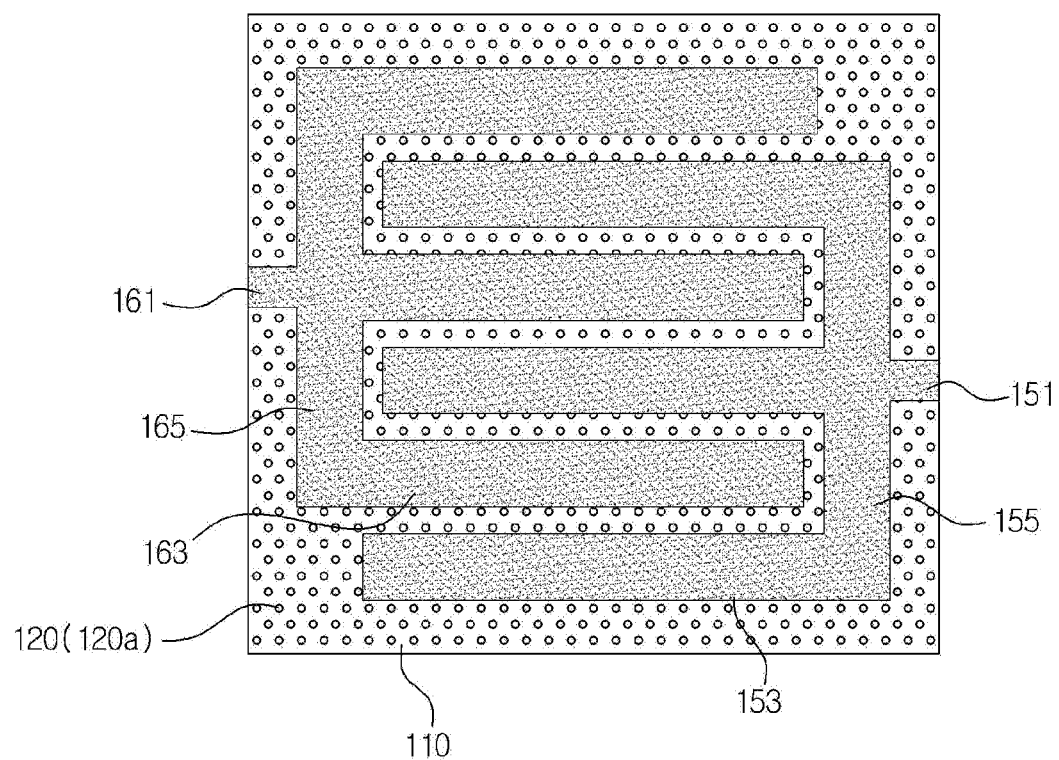
FIG. 3 is a plan view of FIG. 1.

As illustrated in FIGS. 1 to 3, a three-dimensional (3D) capacitor 100 according to a first embodiment of the present invention includes an anodic oxide film 110 formed by anodizing a metal and in which a plurality of holes 120 are formed in a vertical direction, conductors 140 formed inside the holes 120, and a first electrode layer 150 and a second electrode layer 160 formed on at least one surface of the anodic oxide film 110 to be electrically connected to at least some of the conductors 140 and to be electrically separated from each other.

The anodic oxide film 110 may have a cuboid shape.

The anodic oxide film 110 is formed by anodizing a metal. The holes 120 are formed in the anodic oxide film 110 in the vertical direction.

As illustrated in FIG. 2A, holes 120a of the anodic oxide film 110 may be air holes 120a formed by anodizing a metal and may be arranged regularly. The air holes 120a are formed in a vertical direction of the anodic oxide film 110. Furthermore, the air holes 120a are formed to pass through the anodic oxide film 110 in the vertical direction.

The anodic oxide film 110 of FIG. 2A is formed using only a porous layer 180 having the air holes 120a therein. The anodic oxide film 110 is formed by anodizing a base metal of a metal material and removing the base metal of the metal material. Here, the base metal of the metal material may be aluminum (Al), titanium (Ti), tungsten (W), zinc (Zn), or the like, and more preferably, may be aluminum (Al). When the anodic oxide film 110 is formed of aluminum as the base metal, the anodic oxide film 110 has a chemical formula of $Al_2O_3$. Furthermore, the anodic oxide film 110 has an insulating property.

A conductor 140 is formed inside each of the air holes 120a. The conductor 140 may be plated inside each of the air holes 120a by electroless plating or electroplating.

As illustrated in FIG. 2B, holes 120b of an anodic oxide film 110 may be air holes 120b which are formed by anodizing a metal and are arranged regularly. The anodic oxide film 110 may include a porous layer 180 having the air holes 120b therein, and a barrier layer 185 formed below the porous layer 180 to close one end of each of the air holes 120b. A conductor 140 is formed inside each of the air holes 120b.

As illustrated in FIG. 2C, each of holes 120c of an anodic oxide film 110 may be formed to have an inner width greater than that of each of air holes 122.

The holes 120c of FIG. 2C are formed to pass through the anodic oxide film 110 in the vertical direction. The holes 120c may be formed by masking and etching one surface of the anodic oxide film 110.

A conductor 140 is formed inside each of the holes 120c. The conductor 140 may be plated inside each of the holes 120c by electroless plating or electroplating.

Similarly, the anodic oxide film 110 of FIG. 2C includes a porous layer 180 having air holes 122 formed therein by anodizing a metal and arranged regularly, and a barrier layer 185 formed below the porous layer 180 to close one end of each of the air holes 122.

A case in which the holes 120a are the air holes 120a formed to pass through the anodic oxide film 110 in the vertical direction and the conductors 140 are formed inside the air holes 120a as illustrated in FIG. 2A will be described as an example below.

The conductors 140 may be formed inside the air holes 120a by plating. Electric current may flow in the vertical direction through the inside of the air holes 120a via the conductors 140.

The first electrode layer 150 and the second electrode layer 160 are formed on at least one surface of the anodic oxide film 110 to be electrically separated from each other.

As illustrated in FIGS. 1 to 4, in the first embodiment, the first electrode layer 150 and the second electrode layer 160 are formed on a top surface of the anodic oxide film 110. In other words, the first electrode layer 150 and the second electrode layer 160 are formed on the same surface of the anodic oxide film 110.

The first electrode layer 150 and the second electrode layer 160 are formed so as not to overlap in the vertical direction.

The first electrode layer 150 may include a plurality of first straight-line parts 153 arranged in parallel to be separated from each other, a first connection part 155 formed perpendicular to the first straight-line parts 153 to connect one ends of the first straight-line parts 153, and a first power-source connection part 151 connected to the first connection part 155 and to which a power source is connected.

The second electrode layer 160 includes a plurality of second straight-line parts 163 arranged in parallel to be separated from each other, a second connection part 165 formed perpendicular to the second straight-line parts 163 to connect one ends of the second straight-line parts 163, and a second power-source connection part 161 connected to the second connection part 165 and to which the power source is connected.

As illustrated in FIGS. 1 and 3, the first electrode layer 150 and the second electrode layer 160 are alternately arranged. More specifically, the first straight-line parts 153 of the first electrode layer 150 and the second straight-line parts 163 of the second electrode layer 160 are alternately arranged in a horizontal direction to be separated from each other.

Furthermore, as illustrated in FIG. 2A, bottoms of the first electrode layer 150 and the second electrode layer 160 are electrically connected to tops of at least some of the conductors 140. Thus, electric current supplied from the power source is transferred to the conductors 140 inside the air holes 120a via the first electrode layer 150 and the second electrode layer 160.

When a positive (+) current is supplied to the first electrode layer 150 and a negative (−) current is supplied to the second electrode layer 160, all of the conductors 140 connected to the first electrode layer 150 have the positive (+) current and all of the conductors 140 connected to the second electrode layer 160 have the negative (−) current.

Thus, all of the conductors 140 connected to bottoms of the first straight-line part 153 have the positive (+) current, and of all the conductors 140 connected to the second straight-line part 163 have the negative (−) current.

As illustrated in FIG. 2A, since the first straight-line parts 153 and the second straight-line parts 163 are alternately arranged, the conductors 140 having the positive (+) current and the conductors 140 having the negative (−) current are alternately arranged in the horizontal direction. Furthermore, since the anodic oxide film 110 has the insulating property which does not carry electric current, the anodic oxide film 110 serves as an insulating layer between the conductors 140 having the positive (+) current and the conductors 140 having the negative (−) current. Thus, one capacitor is formed between two adjacent conductors 140 respectively having the positive (+) current and the negative (−) current.

A plurality of capacitors may be easily formed by forming the conductors 140 in the air holes 120a of the anodic oxide film 110. That is, the plurality of capacitors may be easily manufactured.

As described above, a high capacitance, relative to a size of the capacitor, may be easily achieved by using the anodic oxide film 110 having the insulating property and the conductors 140 which are arranged at a high density in the anodic oxide film 110 and to which electric current is supplied.

The first power-source connection part 151 may extend to be in contact with one side surface of the anodic oxide film 110 by being connected to the first connection part 155. The second power-source connection part 161 may extend to be in contact with another side surface of the anodic oxide film 110 opposite to the side surface by being connected to the second connection part 165.

A positive (+) current may be supplied to the first power-source connection part 151, and a negative (−) current may be supplied to the second power-source connection part 161.

FIGS. 4A-D follow the progression through a method of manufacturing the 3D capacitor 100 of FIG. 2A according to an embodiment of the present invention.

Figure 4A:
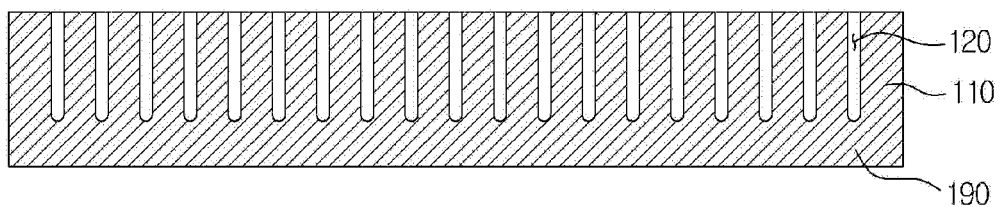
FIGS. 4A-4D are cross-sectional views showing the progression from one step to the next in a method of manufacturing a 3D capacitor according to an embodiment of the present invention.

As illustrated in FIG. 4A, an anode oxide film 110 having air holes 120 on one surface thereof is formed by anodizing a metal 190.

Figure 4B:
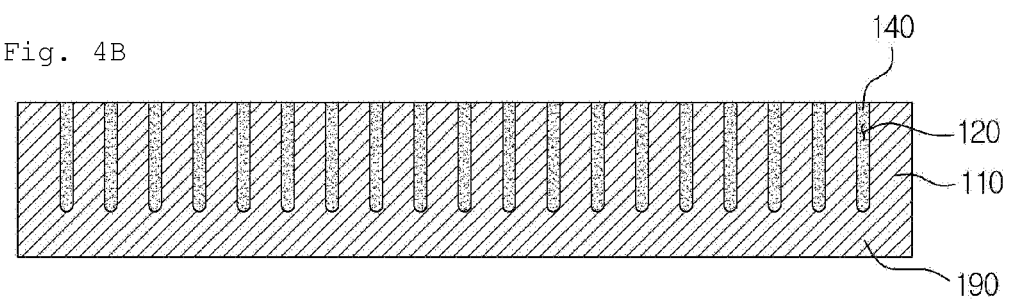

Next, as illustrated in FIG. 4B, the conductor 140 may be formed in each of the air holes 120 by electroless plating or electroplating.

Figure 4C:
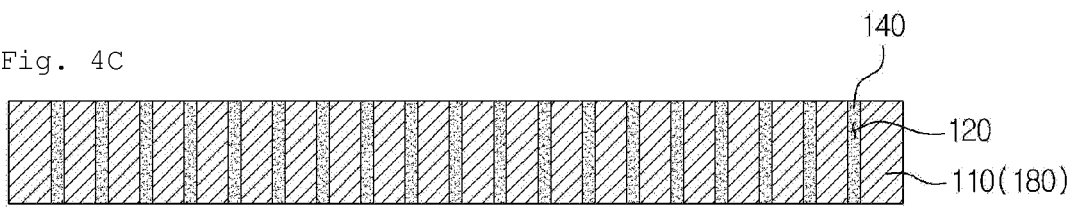

Next, as illustrated in FIG. 4C, the metal 190 is removed such that only the anodic oxide film 110 having the air holes 120 remains.

Figure 4D:
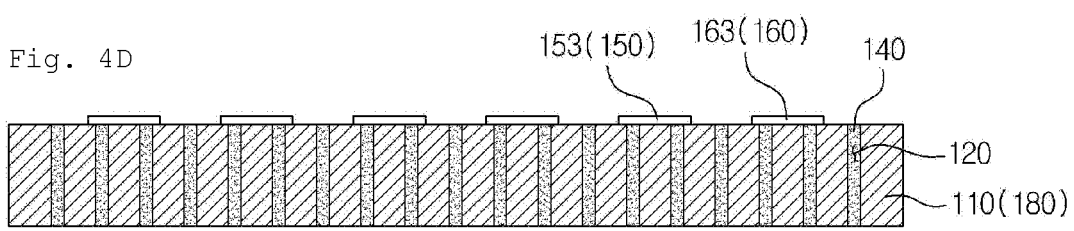

Next, as illustrated in FIG. 4D, the 3D capacitor 100 may be completed by coating one surface of the anodic oxide film 110 with a first electrode layer 150 and a second electrode layer 160.

Figure 5:
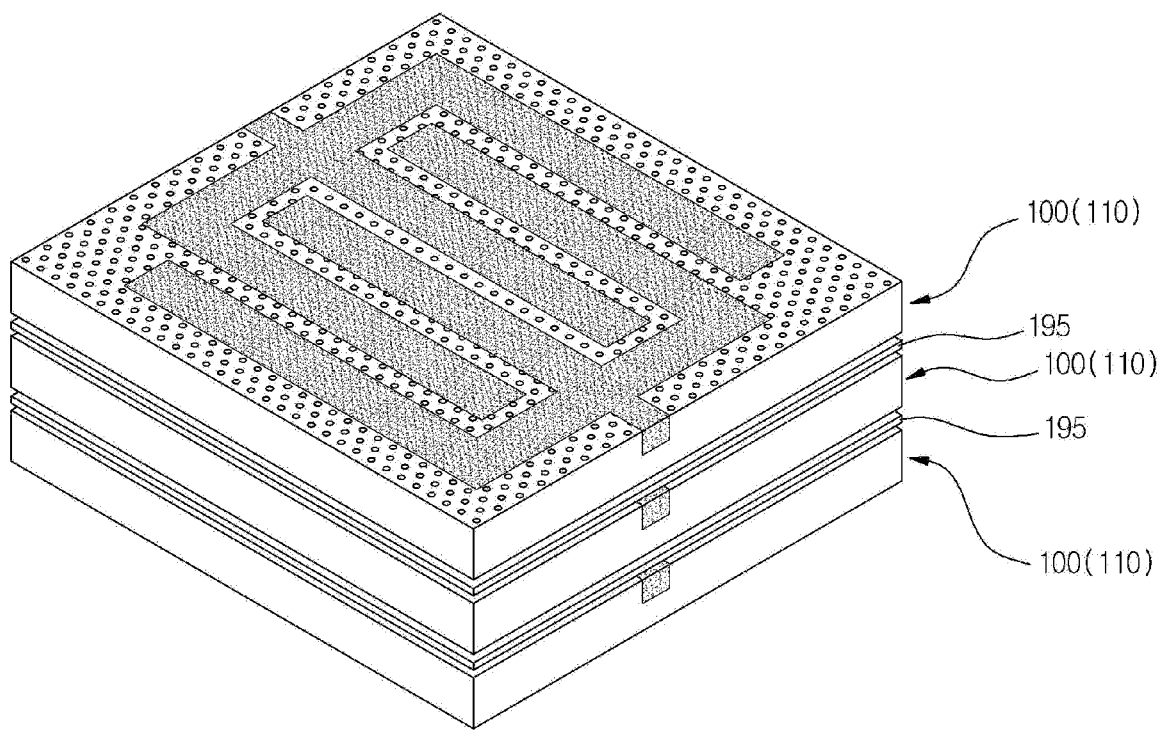
FIG. 5 is a perspective view of a structure obtained by stacking 3D capacitors as shown in FIG. 1.

Alternatively, as illustrated in FIG. 5, a plurality of anodic oxide films 110 each having a first electrode layer 150 and a second electrode layer 160 may be stacked in the vertical direction. Thus, a higher capacitance may be achieved. An insulating film 195 is arranged between two adjacent 3D capacitors 100.

When the conductors 140 are formed in the air holes 120b and the bottoms of the air holes 120b are closed by the barrier layer 185 as illustrated in FIG. 2B, the barrier layer 185 may serve as the insulating film 195. Thus, the 3D capacitors 100 may be stacked without the insulating film 195.

If grooves (not shown) corresponding to the first electrode layer 150 and the second electrode layer 160 are formed in one surface of the anodic oxide film 110 and the first electrode layer 150 and the second electrode layer 160 are formed to be inserted into the grooves, unlike that described above, the 3D capacitors 100 may be stacked without the insulating film 195 even when the air holes 120 are formed to pass through the anodic oxide film 110 in the vertical direction and the conductors 140 are formed inside the air holes 120. The grooves may be formed by etching.

Figure 6:
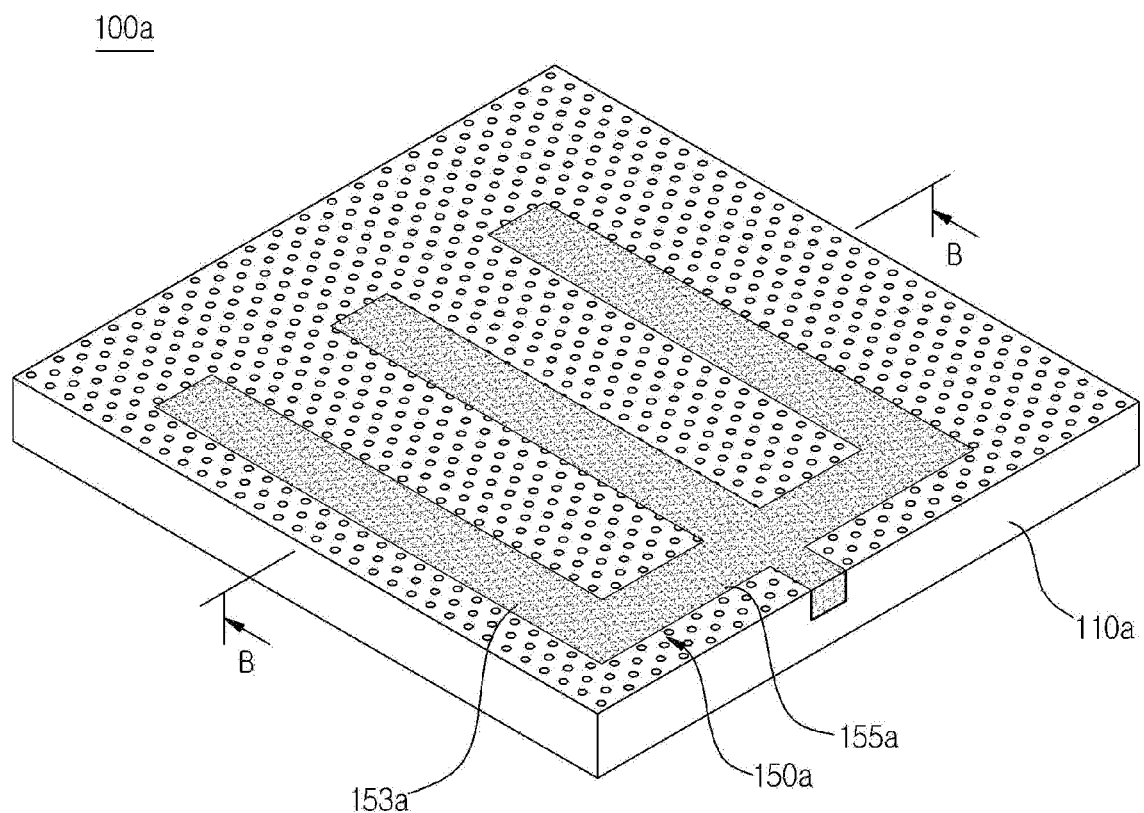
FIG. 6 is a perspective view of a 3D capacitor according to a second embodiment of the present invention.

A second embodiment will be described with reference to FIGS. 6 and 7 below.

The second embodiment will be described focusing on differences from the first embodiment without redundantly describing parts of the second embodiment which are the same as those of the first embodiment.

The first electrode layer 150a may include a plurality of first straight-line parts 153a arranged in parallel to be separated from each other, and a first connection part 155a formed perpendicular to the first straight-line parts 153a to connect one ends of the first straight-line parts 153a.

In a 3D capacitor 100a according to the second embodiment, a first electrode layer 150a is formed on one surface of an anodic oxide film 110a and a second electrode layer 160a is formed on another surface of the anodic oxide film 110a which is opposite to the surface the first electrode layer 150a is formed. As illustrated in FIGS. 6 and 7, the first electrode layer 150a may be formed on a top surface of the anodic oxide film 110a and the second electrode layer 160a may be formed on a bottom surface of the anodic oxide film 110a.

Next, air holes 120a are formed to pass through the anodic oxide film 110a in the vertical direction, and conductors 140a are formed in the air holes 120a.

Figure 7:
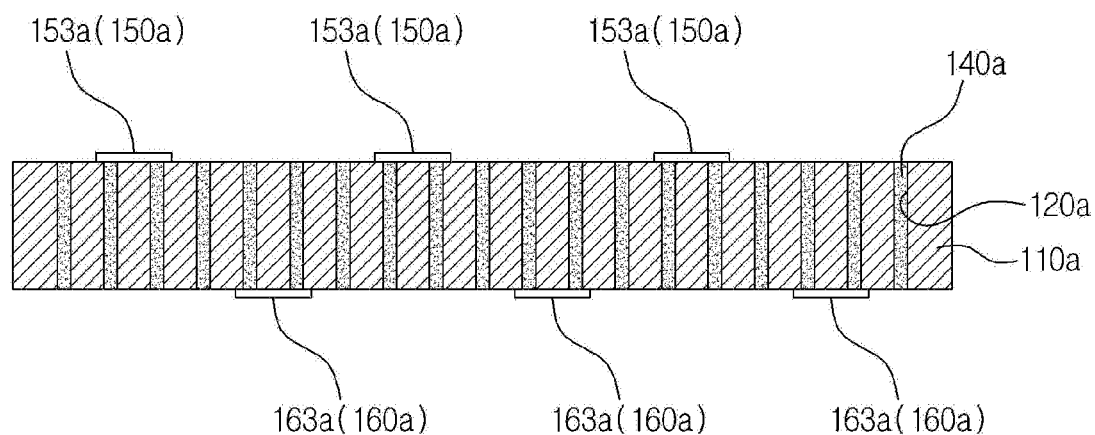
FIG. 7 is a cross-sectional view taken along line B-B of FIG. 6.
Figure 8:
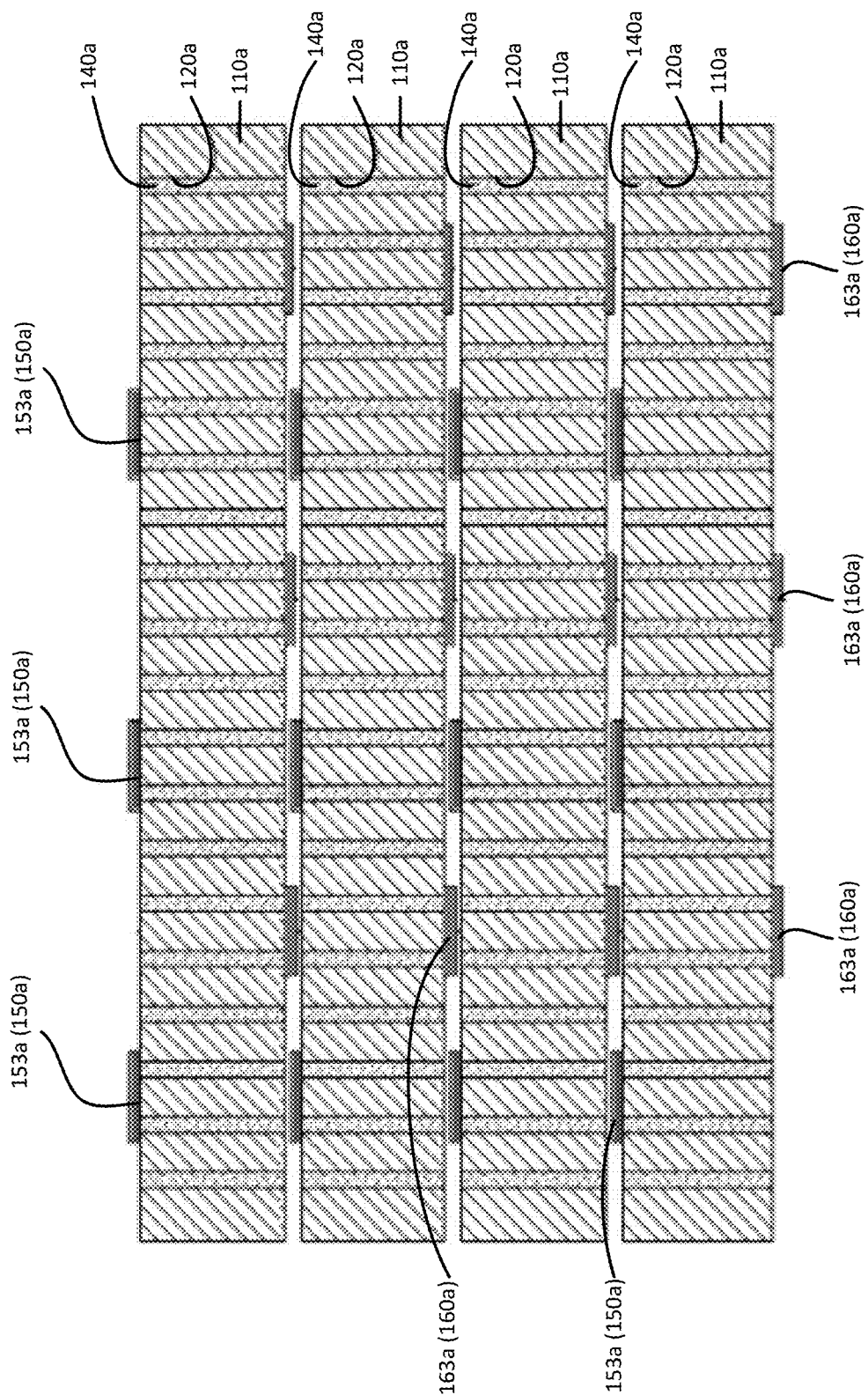
FIG. 8 is a cross-sectional view of a structure obtained by stacking the 3D capacitors of FIG. 6.

As illustrated in FIG. 7, a vertically projected region of the first electrode layer 150a and a vertically projected region of the second electrode layer 160a are alternately arranged. More specifically, vertically projected regions of first straight-line parts 153a of the first electrode layer 150a and vertically projected regions of second straight-line parts 163a of the second electrode layer 160a are alternately arranged.

Thus, positive (+) current is applied to the conductors 140a electrically connected to the first electrode layer 150a, and (−) current is applied to the conductors 140a electrically connected to the second electrode layer 160a. The conductors 140a having positive (+) current and the conductors 140a having negative (−) current are thus alternately arranged in the horizontal direction. Accordingly, a plurality of capacitors are formed as in the first embodiment.

While the present invention has been described above with respect to exemplary embodiments thereof, those of ordinary skill in the art may implement the present invention while making various changes or modifications therein without departing from the idea and scope of the present invention defined in the appended claims.

The invention claimed is:

1. A three-dimensional (3D) capacitor comprising:
an anodic oxide film having a first plurality of holes therein and a second plurality of holes, each of the first plurality of holes extending in a vertical direction, each of the second plurality of holes extending in the vertical direction and having a larger inner diameter than that of each of the first plurality of holes, wherein the first plurality of holes are formed by anodizing a metal and are arranged regularly, and the second plurality of holes are formed by etching the first plurality of holes;
a plurality of conductors formed inside the second plurality of holes;
a first electrode layer formed on an upper surface of the anodic oxide film to be electrically connected to a first plurality of conductors among the plurality of conductors of the second plurality of holes; and
a second electrode layer formed on the upper surface of the anodic oxide film to be electrically connected to a second plurality of conductors among the plurality of conductors of the second plurality of holes, the first and second electrode layers being electrically separated from each other,
wherein the first electrode layer and the second electrode layer are alternately arranged, and
wherein the first electrode layer does not overlap with the second electrode layer when seen in a plan view.

* * * * *